United States Patent [19]

Lee et al.

[11] Patent Number: 5,562,938
[45] Date of Patent: Oct. 8, 1996

[54] COOKED AND PACKAGED STARCHY FOODSTUFFS

[75] Inventors: Yanien Lee, Manlius; Carleton G. Merritt, Phoenix; Stephen R. Gillmore, Cato; Nancy E. Dermody, Camillus, all of N.Y.

[73] Assignee: Borden, Inc., Columbus, Ohio

[21] Appl. No.: 446,320

[22] Filed: May 22, 1995

Related U.S. Application Data

[63] Continuation of Ser. No. 177,950, Jan. 6, 1994, abandoned, which is a continuation-in-part of Ser. No. 991,454, Dec. 15, 1992, abandoned, and a division of Ser. No. 912,116, Jul. 9, 1992, abandoned, which is a continuation of Ser. No. 745,055, Aug. 6, 1991, abandoned, which is a continuation of Ser. No. 511,965, Apr. 17, 1990, Pat. No. 5,057,330, which is a continuation of Ser. No. 140,208, Dec. 31, 1987, abandoned.

[51] Int. Cl.⁶ .............. A23L 3/10; B65B 25/02; B65D 85/00
[52] U.S. Cl. .......... 426/106; 426/307; 426/321; 426/324; 426/325; 426/410; 426/412; 426/510; 426/557; 426/618; 426/648; 426/650
[58] Field of Search .............. 426/106, 302, 426/307, 321, 324, 325, 410, 412, 509, 510, 511, 557, 618, 648, 650

[56] References Cited

U.S. PATENT DOCUMENTS

| | | | |
|---|---|---|---|
| 1,966,927 | 7/1934 | Fiske | 426/325 X |
| 2,434,388 | 1/1948 | Brehm | 426/557 |
| 2,594,213 | 4/1952 | Rahn | 426/325 |
| 3,454,406 | 7/1969 | Alderton | 426/325 |
| 3,492,128 | 1/1970 | Brennan et al. | 426/650 X |
| 3,495,989 | 2/1970 | Lewis et al. | 426/557 |
| 3,762,931 | 10/1973 | Craig et al. | 426/557 |
| 3,769,028 | 10/1973 | Katz et al. | 426/412 X |
| 4,145,451 | 3/1979 | Oles | 426/321 |
| 4,457,702 | 7/1984 | Marchetti | 426/412 X |
| 4,477,478 | 10/1984 | Tiberio et al. | 426/330.6 |
| 4,540,590 | 9/1985 | Harada et al. | 426/324 |
| 4,552,772 | 11/1985 | Saitoh et al. | 426/557 |
| 4,597,976 | 7/1986 | Doster et al. | 426/325 |
| 4,599,238 | 7/1986 | Saitoh et al. | 426/557 |
| 4,734,291 | 3/1988 | Raffensperger | 426/325 |
| 4,828,852 | 5/1989 | Hsu et al. | 426/557 X |

FOREIGN PATENT DOCUMENTS

| | | |
|---|---|---|
| 239656 | 10/1987 | European Pat. Off. . |
| 415787 | 3/1991 | European Pat. Off. . |
| 48-26227 | 6/1973 | Japan . |
| 53-20448 | 2/1978 | Japan . |
| 53-37423 | 9/1978 | Japan . |
| 59-2666 | 9/1984 | Japan . |
| WO91/03169 | 3/1991 | WIPO . |

OTHER PUBLICATIONS

The application as filed of U.S. Serial No. 653,653 filed Sep. 21, 1984.

*Primary Examiner*—Leo B. Tentoni
*Attorney, Agent, or Firm*—Roylance, Abrams, Berdo & Goodman, L.L.P.

[57] ABSTRACT

Fully cooked, starchy foodstuffs, such as rice and pasta, are preserved against microbiological spoilage by treatment with a predetermined quantity of an edible acid. Packages of fully cooked starchy foodstuffs are provided which are shelf-stable for periods in excess of 6 months and are neutralized to a proper pH to avoid sourness. Ready-to-eat meals of neutralized acid preserved starchy foodstuffs are also provided. Edible alkaline neutralizing agents may be used to balance the pH. Also provided are methods for producing shelf-stable fully cooked, starchy foodstuffs wherein measured quantities of acid are introduced to fully cooked, starchy foodstuffs to inhibit microbiological growth.

19 Claims, No Drawings

5,562,938

COOKED AND PACKAGED STARCHY FOODSTUFFS

BACKGROUND OF THE INVENTION

This application is a continuation of Ser. No. 08/177,950 filed Jan. 6, 1994 now abandoned, which was a continuation-in-part of Ser. No. 07/991,454 filed Dec. 15, 1992 now abandoned, and a divisional of Ser. No. 07/912,116 filed Jul. 9, 1992 now abandoned, which was a continuation of 07/745,055 filed Aug. 6, 1991 now abandoned, which was a continuation of 07/511,965 filed Apr. 17, 1990 issued as U.S. Pat. No. 5,057,330 which was a continuation of Ser. No. 07/140,208 filed Dec. 31, 1987 now abandoned.

FIELD OF THE INVENTION

This invention is directed to packaged fully cooked meals which are preserved against microbiological spoilage, methods for producing such packaged meals, and the ready-to-eat meals that may be so packaged. More particularly, this invention is directed to fully cooked, starchy foodstuffs which are stabilized against spoilage at room temperature by reducing their pH values to acidic levels, and to such packaged foodstuffs.

BACKGROUND OF THE INVENTION

Reducing the pH of food products by the addition of an edible acid to preserve against microbiological spoilage is well known. Such a method for preserving food is often referred to as "pickling" or "acid preservation". This method of preservation is common for uncooked foods such as olives, cucumbers, peppers and other raw vegetables. This method is well suited for foods where a tart flavor is desired, such as pickles, salad dressings, relishes and the like.

The preservation of starchy foodstuffs by the addition of an edible acid has been accomplished. Although enhanced shelf-stability is obtained, there are drawbacks. Foodstuffs so preserved exhibit a tart, sour taste due to the presence of the acid. This is acceptable for some food preparations such as cold pasta and potato salads with dressings having an acidic pH. It is recognized that to expand the versatility of acid-preserved starchy foodstuffs, the sour taste contributed by the acid used must be avoided.

For example, Tiberio et al., U.S. Pat. No. 4,477,478, teaches the use of fumaric acid in combination with acetic acid to preserve dressings for salad having a lower perceived tartness. In addition, Saitoh et al., U.S. Pat. No. 4,552,772, disclose the use of salt with citric or lactic acid to improve the palatability of cooked, acid-preserved, wheat flour based alimentary pastes. Although an improvement in taste is alleged, Saitoh et al. admit that the product exhibits a detectable sourness, although weakened, at column 4, line 15 of the patent.

It remains desirable to provide an acid-preservation system for cooked starchy foodstuffs, particularly alimentary pastes, rice and potatoes, while avoiding, minimizing or overcoming the sour taste of the acid utilized.

SUMMARY OF THE INVENTION

There is provided by this invention (1) a shelf-stable, fully cooked meal, (2) a ready-to-eat meal that can be packaged, and (3) a method for producing a shelf-stable, fully cooked, starchy foodstuff, that may be packaged.

In one embodiment, the package of a shelf-stable, fully cooked meal of this invention comprises two containers. A primary container isolates a preserved food composition sealed therein from atmospheric oxygen. This preserved food composition comprises a shelf-stable, fully cooked, starchy foodstuff and an edible acid that is uniformly dispersed in this primary container with said foodstuff, in a quantity which provides shelf-stability. The quantity of acid preferably provides a pH for the starchy foodstuff of about 3.5 to about 4.6, preferably 4.0 to 4.5, more preferably 4.2 to 4.5. A secondary container isolates the contents therein from the preserved food composition. The contents of the secondary container comprise an edible alkaline neutralizing agent in a quantity sufficient upon mixing with the starchy foodstuff to increase its pH to a value in the range of about 5 to about 7.

The process of this invention for producing a packaged, shelf-stable, fully cooked, starchy foodstuff comprises first preparing a starchy foodstuff for packaging by:

(a) heating the starchy foodstuff in boiling water, steam or combinations thereof until fully cooked, the quantity of water/steam being sufficient to provide the desired moisture level in the starchy foodstuff, (b) adding a quantity of an aqueous solution of an edible acid to the fully cooked, starchy foodstuff sufficient to provide shelf-stability, wherein said edible acid preferably provides a pH for the starchy foodstuff in the range of about 3.5 to about 4.6, more preferably 4.0 to 4.5, and more preferably 4.2 to 4.5, (c) mixing the edible acid solution and the fully cooked, starchy foodstuff to distribute the edible acid on the foodstuff, and (d) mixing an edible lubricant, preferably a vegetable oil, with the mixture of edible acid and starchy foodstuff, wherein the edible lubricant has a melting point below about 95° F. (35° C.), is used in a quantity up to about 15% by weight, based on the weight of the total package contents, and forms a coating on the foodstuff.

A container is then filled with the thus prepared starchy foodstuff, sealed to exclude atmospheric oxygen and the contents of said container are then aseptically packaged, i.e., they are sterilized or pasteurized once packaged or are maintained under sterile or pasteurized conditions during packaging. The container isolates its contents from atmospheric oxygen and is resistant to wet heat at a temperature above about 180° F. (82° C.). "Wet heat" refers to the condition of high temperatures (above about 180° F.) and high humidity (above about 85° RH). Such conditions are present within a steam tunnel or within a vessel of boiling water.

DETAILED DESCRIPTION OF THE PREFERRED EMBODIMENTS

The starchy foodstuffs suitable for use in this invention include grains, potatoes, starchy legumes and alimentary pastes. Preferably, the starchy foodstuff has a porous surface and is selected from grains, alimentary pastes and potatoes. Examples of preferred grains include rice, barley and wheat. The starchy foodstuffs selected for use in the present invention must be ready to be cooked, i.e., prepared for cooking and consumption by the removal of any hard, inedible shell by peeling, pearling or other means. Of the grains, rice is most preferred.

Of the alimentary pastes, virtually any paste obtained from a glutinous flour is suitable for use in the embodiments of this invention. Examples of suitable glutinous flours include semolina flour, durum wheat flour, corn flour, buckwheat flour, farina flour and whole wheat flour. Their pastes all exhibit porous surfaces. Pastes obtained from rice flour, a nonglutinous flour, are also suitable, especially if the starch is gelatinized or partially gelatinized.

Potatoes that have been cut and/or peeled so as to expose porous surfaces are suitable for use. Any variety of potato may be used in the present invention.

The starchy foodstuff used is fully cooked so that it may be eaten as is from its container directly off the shelf or heated to a desired temperature. Heating the starchy foodstuff to cause it to absorb additional moisture, gelatinize additional starch, or denature additional protein is not required. Each of these phenomena may occur upon heating, but is of no consequence to this invention.

When fully cooked, alimentary pastes generally have moisture contents of about 65% to 85% by weight. Fully cooked rice generally has a moisture content of from about 60% to about 70% or more by weight, and fully cooked potatoes generally have a moisture content of about 70% to 80% by weight. These values for moisture levels are provided as guides only. The fully cooked, starchy foodstuffs used in the present invention are not limited to species having these moisture levels.

The packaged starchy foodstuffs of the present invention are shelf-stable. The term "shelf-stable," as used herein, indicates that the foodstuff is stabilized against spoilage by microbiological growth at room temperature for a period of not less than 1 week. Preferably, the starchy foodstuffs are preserved against microbiological spoilage for a period of 6 months or more. To achieve shelf-stability, an edible acid is admixed with the starchy foodstuff. The pH of the starchy foodstuff is reduced to acidic levels of from about 3.5 to about 4.6 with the solution of edible acid, preferably 4.0 to 4.5, more preferably to 4.2 to 4.5, and most preferably, to 4.3.

Starchy foodstuffs are not inherently acidic, so it is necessary to add an edible acid, i,e., one which can be ingested without harmful effect. Suitable acids include acetic acid, citric acid, tartaric acid, hydrochloric acid, malic acid, propionic acid, adipic acid, fumaric acid, phosphoric acid, lactic acid, sorbic acid, benzoic acid and mixtures thereof. Certain acids may be preferred because of their effectiveness. The quantity of edible acid added to the starchy foodstuff is preferably sufficient to provide a pH within the ranges described above. Preferred pH values fall in the range of about 4.0 to 4.6, or more preferably 4.2 to about 4.5.

To be effective, the edible acid is distributed in a substantially uniform manner so as to retard the growth of molds, bacterial and yeasts which cause spoilage. The acid may be diluted to aid distribution. For pasta, an acid concentration of 5% to 10% in an aqueous solution is preferred, and for rice, 10% to 20%. It is preferable that the acid penetrate into the surface of the starchy foodstuffs, which is why porous starchy foodstuffs are preferred. For example, rice which has been acid preserved has been found to have a shelf life of more than 9 months at room temperature.

The package of a shelf-stable, fully cooked meal provided by one preferred embodiment of this invention comprises 2 containers. One of these containers is a primary container and serves to isolate a pasteurized food composition sealed therein from atmospheric oxygen. This preserved composition comprises a fully cooked, starchy foodstuff preserved with an edible acid. The edible acid is uniformly distributed within the preserved food composition and is preferably used in a quantity which provides a pH for the starchy foodstuff in the range of about 4.0 to about 4.6, more preferably 4.2 to about 4.5 This can be accomplished by adding and mixing a quantity of an aqueous solution of an edible acid to the fully cooked, starchy foodstuff or by immersing the fully cooked, starchy foodstuff in a volume of diluted acid and weighing the volume of diluted acid both before and after immersion to determine the quantity of acid absorbed.

The preserved food composition may contain a mixture of fully cooked, starchy foodstuff, shelf-stable foods other than starchy foodstuffs, and other components such as vegetable oil for lubrication, water to aid acid dispersion, preservatives for added shelf life, seasonings or sauces for flavor, vitamin and mineral supplements, etc. The addition of these ingredients is optional.

The primary container must be comprised of a material having good oxygen barrier properties. Such materials include metals, glass, some synthetic resins such as Saran™ film or other oxygen barrier films, some resin coated papers or foils, and combinations thereof. Suitable containers include metal cans, glass jars, paper/metal foil pouches, some selected synthetic resin film pouches, and suitably coated paper cartons. Metal cans or paper/foil pouches have high resistance to oxygen permeation, as do glass jars. However, such packages are undesirable for use in microwave ovens in that they reflect microwave energy. Synthetic resins generally do not reflect a significant amount of microwave energy and provide the advantage of convenience where the foodstuff is to be heated. However, synthetic resins generally have less desirable barrier properties to oxygen when compared to glass or metal.

Barrier properties of synthetic resins differ, and some resins must be modified to provide suitable barrier properties. Vapor barrier properties of synthetic resins can be enhanced by incorporating barrier resistant particles such as glass, minerals or metals in fiber, flake or particle form. Some synthetic resins are suitable without modification such as, for example, polyethylene terephthalate (medium and high density), polypropylene terephthalate (low density), polyvinylidene chloride SARAN™ trademark for a vinyl chloride-vinylidene chloride copolymer), and polyamides.

When a synthetic resin is selected for use in providing a pouch or rigid container for the shelf-stable, fully cooked meal, the vapor barrier properties of the container may usually be enhanced by increasing the thickness of the container wall. The thickness of the wall for a container pouch comprised of a synthetic resin preferably is in the range from about 2 mils to 5 mils. Such a container pouch provides a reasonable resistance to puncture during handling and permits effective heat sealing of the pouch.

Where the synthetic resin desired will not provide the desired barrier properties within this thickness range, thin layers of material with higher barrier properties can be added to help maintain the container thickness in this range. In a preferred embodiment, polyester pouches such as polyethylene terephthalate are used having a wall thickness of about 2 to 4 mils. Since polyethylene terephthalate has good oxygen barrier properties, it may also be used in a laminate with a base film layer that may be cheaper but is not a good oxygen barrier.

To isolate the preserved food composition from atmospheric oxygen, air must first be excluded prior to sealing the container. This can be accomplished by applying vacuum and/or compressing the container to evacuate air or by incorporating an inert atmosphere within the container such as nitrogen, carbon dioxide, or water vapor. Alternatively, water vapor may be generated from the container prior to and during sealing of said container so as to exclude a significant portion of atmospheric oxygen. A vacuum forms in the sealed container once the water vapor condenses upon cooling. Such a method is preferred in that it need not require a separate processing step where the contents of the container are sufficiently hot to generate adequate water vapor.

To complete one embodiment of the package of the shelf-stable, fully cooked meal provided by this invention, a second container is required which substantially isolates its contents from the preserved food composition. The contents of the second container comprise an edible alkaline neutralizing agent. The quantity of this alkaline neutralizing agent is matched with the quantity of edible acid within the primary container so that upon mixing, the pH of the fully cooked, starchy foodstuff is raised to a value in the range of about 5 to about 7 when mixed. Suitable alkaline neutralizing agents comprise edible alkali metal carbonates, such as sodium bicarbonate, sodium carbonate, potassium bicarbonate and potassium carbonate. These alkaline neutralizing agents are preferably encapsulated in inert fillers, fats or oils. Suitable fats and oils include dehydrated butterfat or palm oil and suitable inert fillers include edible salts. The alkaline neutralizing agent and encapsulant are preferably in solid, dry powder form so as to prevent the growth of microorganisms and to prevent loss of the encapsulated alkaline neutralizing agent by reaction with water. The contents of the second container are preferably in solid, dry form, so that the container need not exhibit the oxygen barrier properties required of the primary container. Preferably, however, the second container isolates its contents from moisture and humidity.

Other ingredients may be included in the second container along with the alkaline neutralizing agent and encapsulant, provided these ingredients are shelf-stable. Such additional ingredients will more commonly be seasonings, such as, for example, salt, dehydrated cheese, dried bread crumbs, dried onions, dried chives and the like. Conventional preservatives such as propylene glycol, sodium benzoate, etc. may also be introduced.

The contents of the primary container must be pasteurized or sterile. This can be accomplished by maintaining the fully cooked, starchy foodstuff and other components under pasteurized conditions or sterile conditions until sealed within the primary container. Maintaining the fully cooked, starchy foodstuff at a temperature above about 180° F. (82° C.) until packaged will generally provide a pasteurized food composition. Higher temperatures are necessary to provide a sterile food composition. Alternatively, or in addition to maintaining the fully cooked, starchy foodstuff under pasteurized or sterile conditions, the contents of the primary container may be sterilized or pasteurized by any conventional means after sealing.

For example, pasteurization can be achieved by heating the contents of the primary container to a temperature above about 180° F. (82° C.) by treatment of the sealed primary container with steam or boiling water. For sterilization, the contents are heated to a temperature of about 212° F. (100°) and above. Pasteurizing is preferred in that its effect on taste and texture of the food composition is minimized. Alternative methods of pasteurizing or sterilizing the contents of the primary container without radiant heat include treatment with microwave radiation and/or UV radiation.

A package of a shelf-stable, fully cooked meal will preferably have a shelf life greater than 1 month and more preferably will be shelf-stable for a period of at least about 6–9 months. It should be noted that a longer shelf life may be obtained by sterilizing the contents of the primary container, or by adding conventional food preservatives, such as, for example, propylene glycol, sodium benzoate and the like.

A further embodiment of the present invention is directed to a ready-to-eat meal comprising an admixture which comprises a fully cooked, starchy foodstuff selected from the group consisting of alimentary pastes, grains and potatoes. This fully cooked, starchy foodstuff is shelf-stabilized by preservation with an edible acid. Suitable edible acids include those described above for the package of a shelf-stable, fully cooked meal. Prior to incorporation into the admixture, this shelf-stable starchy foodstuff exhibits a pH value in the range of about 3.5 to 4.6, preferably 4.0 to about 4.6, more preferably 4.2 to 4.5, and most preferably about 4,3, due to the presence of the edible acid.

Also included in the admixture may be a quantity of edible alkaline neutralizing agent, generally sufficient to neutralize at least 40% by weight of the edible acid, but in any case sufficient to provide a pH having a value in the range of about 5 to about 7 for the fully cooked, starchy foodstuff within the admixture.

The ready-to-eat meals are distinguished from the packaged meals of this invention in that the edible neutralizing agent is combined with the preserved food composition in the ready-to-eat meals but the edible neutralizing agent remains isolated from the preserved food composition in the packaged meals. Therefore, the condition of the ready-to-eat meals will be a neutralized starchy foodstuff having a pH in the range of 5–7. When in such a condition, the meal is considered "ready-to-eat."

Suitable edible neutralizing agents include sodium bicarbonate, potassium bicarbonate, sodium carbonate and potassium carbonate. The starchy foodstuffs used in the ready-to-eat and packaged meals are preferably rice and alimentary pastes. The preferred edible acids are propionic acid and lactic acid.

It is important to note that the admixture may contain other components such as sauces (cheese, egg/cream), vegetables, seasonings (salt, garlic, onion, chives), oils, foodstuffs other than the starchy foodstuffs selected above (mushrooms, meats, vegetables) which are common to pasta and rice meals, for example. In addition, this ready-to-eat or packaged meal may be heated, maintained at ambient temperature or chilled, where desired. The additional ingredients may be premixed with either the edible alkaline neutralizing agent or the fully cooked, starchy foodstuff. Alternatively, the additional ingredients may be mixed simultaneously with or subsequently to the admixture of these primary components.

The ready-to-eat meals provided by this invention may be obtained from a package of a shelf-stable, fully cooked meal provided by this invention and described above. However, it is important to note that these ready-to-eat meals may be obtained by utilizing components which are not packaged or are packaged by alternative means and methods.

A further embodiment of the present invention is directed to processes for producing packaged, shelf-stable, fully cooked, starchy foodstuffs. The starchy foodstuffs utilized in this process are those previously defined as preferred, i.e., those selected from the group consisting of alimentary pastes, grains and potatoes. Of these starchy foodstuffs, rice and alimentary pastes are most preferred.

One preferable embodiment of the invention is a process of preparing an edible starchy foodstuff of pasta or rice that is characterized by inhibited microbiological spoilage, comprising the sequential steps of: heating said foodstuff at a temperature of at least about 180° F. (82° C.) to fully cook said foodstuff and render it edible, then applying to said fully cooked foodstuff an aqueous solution of an edible acid while maintaining said foodstuff at a temperature of at least about 180° F. (82° C.) whereby the pH of said hot acidified foodstuff is adjusted to be in the range from about 3.5 to about 4.6, as determined by placing a 50 g sample of said acidified cooked foodstuff together with 50 g of distilled water in a Waring or other intimate blender and operating said blender to form a puree, then measuring the pH of said puree, then optionally coating said foodstuff with edible oil, whereby a shelf-stable cooked foodstuff is obtained.

The package produced by the process of the present invention contains an edible acid and optionally an edible lubricant in addition to the starchy foodstuffs therein. Suitable edible acids are those as defined previously, used as dilute aqueous solutions. Preferred edible acids include propionic acid and lactic acid.

The edible lubricant within the package produced by this process must have a melting point below about 95° F. (35° C.) to provide the desired function of preventing the fully cooked, starchy foodstuff from sticking and forming a solid mass. Preferably, below about 15% by weight edible lubricant is used, based on the total weight of the package contents. This weight limit prevents the finished product from becoming too greasy or oily and unpalatable. Preferred quantities of edible oil generally range from about 1% to 8% by weight of the total package contents. Suitable edible lubricants include corn oil, unsaturated safflower oil, palm oil, olive oil, peanut oil, coconut oil, sunflower oil and solid fats such as butterfat.

The process of this invention comprises preparing a starchy foodstuff by heating it in boiling water, steam or combinations of both until it is fully cooked. Cooking the starchy foodstuff increases its moisture content and thereby increases its tenderness. The degree of tenderness for a fully cooked, starchy foodstuff varies, depending upon personal tastes. The term "fully cooked," as used herein, is intended to include all degrees of tenderness commonly desired for ready-to-eat starchy foodstuffs. For example, with respect to alimentary pastes, those pastes cooked to provide a soft surface texture and a hard, firm center commonly referred to as "al dente" are included within the term "fully cooked," as well as those pastes which are cooked to a soft texture throughout, providing maximum moisture levels and maximum tenderness.

The quantity of water and steam utilized to cook the starchy foodstuff must be sufficient to provide the desired tenderness. Excess quantities of water can be utilized. However, when excess water is used, the starchy foodstuff must be drained, often resulting in product loss. It is preferable to avoid the need for draining the fully cooked, starchy food product.

To this fully cooked, starchy foodstuff is added an aqueous solution of an edible acid in a predetermined quantity and concentration sufficient to provide shelf-stability, i.e. to a pH having a value in the range of about 3.8 to about 4.6. Suitable quantities of acide generally fall in the range from about 0.01% to 1.5% by weight of acid solution, based on the weight of fully cooked, starchy foodstuff. The preferred pH is one having a value of about 4.0 to 4.6, or more preferably, 4.2 to 4.5.

The edible acid and fully cooked, starchy foodstuff are agitated so as to disperse the acid on the surface of the cooked foodstuff. The pH values for the starchy foodstuffs herein are determined by first mincing the starchy foodstuff, or a sample thereof, in distilled water to form a slurry or puree, and then measuring the pH of the resultant slurry or puree. Adequate slurries can be obtained for 50 gm samples of starchy foodstuff with 50 gm of distilled water by mixing in a Waring blender for about 1 minute and longer. In obtaining the desired pH, porous foodstuffs such as rice, potatoes and alimentary pastes absorb the edible acid beneath their surfaces. This is a beneficial phenomenon in that it typically enhances shelf-stability.

Agitation of the edible acid and foodstuff is preferably sufficiently mild to preserve the integrity of the foodstuff's shape and form. It is undesirable to cut, grid or mince the foodstuff while mixing it with the acid, oil, or other additive. Therefore, agitation equipment which provides the desired dispersion without damaging the shape of the foodstuff is preferred. Examples include ribbon type mixers, and the like. Where a ribbon mixer is used, agitation of from 1 to 3 minutes is suitable.

To the acidified, fully cooked, starchy foodstuff there is preferably added an edible lubricant in a quantity as described above. Mixing of the acidified, fully cooked, starchy foodstuff and the edible lubricant is not essential; however, to obtain the most beneficial effect, mixing is preferred, to distribute the lubricant over the starchy foodstuff.

It should be recognized that further steps in preparing the starchy foodstuff for consumption are suitable, such as marination, frying, blending and seasoning, etc., provided these added treatments do not interfere with shelf-stability. Other components may be added if they are shelf-stable, such as food preservatives.

The starchy foodstuff thus prepared may be sealed within a container so as to exclude atmospheric oxygen. The container must be resistant to wet heat in excess of 180° F. (82° C.) to permit subsequent processing and to accept the prepared starchy foodstuff when said foodstuff is hot from cooking. Those containers described above as suitable for packages of fully cooked meals provided by this invention are also suitable for use in the process described herein. Containers of glass, metal and synthetic resins are acceptable with preferred containers being comprised of synthetic resins, particularly polyesters (polyethylene terephthalate). The preferred thickness for resin film pouches ranges from about 2 mils to 4 mils.

Air must be excluded from the container prior to sealing. This can be accomplished by an conventional means such as applying vacuum or incorporating an inert atmosphere such as nitrogen, carbon dioxide or water vapor within the container. Generating a water vapor within the container is preferred in that a separate processing step is not needed where the prepared starchy foodstuff remains hot from the cooking steps.

The contents of the packages produced by the process herein are pasteurized or sterile. This condition may be achieved by exposing the contents to sterilization processes and/or pasteurization processes subsequent to sealing the container. For example, pasteurization can be accomplished by heat treatment of the sealed packages with steam vapor or by immersion in hot water at a temperature above about 180° F. (82°C.). By utilizing higher temperatures, sterilization is achieved. Alternative methods for providing a sterile or pasteurized condition include treatment with UV radiation and microwave radiation.

A convenient method for achieving a pasteurized sterile condition is to maintain the prepared starchy foodstuff under pasteurized/sterile conditions after cooking until sealed in the container. Cooking the starchy foodstuff in boiling water, steam or combinations of both will pasteurize or sterilize it, depending on the temperature used. This condition can be retained by maintaining the foodstuff at a sufficiently high temperature after cooking until it has been sealed in an aseptic container. The preferred temperature range is about 180° F. (82° C.) to about 210° F. (98° ), which provides a pasteurized condition. To insure against growth of microorganisms the contents of the aseptic container may be subjected to a pasteurization step or sterilization step after sealing.

The packaged, shelf-stable, fully cooked, starchy foodstuffs produced by the process of this invention will have a shelf life greater than 1 month and typically greater than 6 months. Shelf life may be extended by selecting particular acids, incorporating food preservatives within the fully cooked, starchy foodstuff, and/or by sterilizing the contents of the sealed package.

The following examples are provided to further illustrate the invention. In these examples and throughout the specification, all temperatures are expressed in degrees Fahrenheit and each value is accompanied by an approximation of such value in degrees Celsius. All pH values for the starchy foodstuff, described in the examples and the claims which follow, are measured from slurries of 50 gm samples of these starchy foodstuffs with 50 gm of distilled water measured after mincing the 50 gm starchy foodstuff samples in the distilled water in a Waring blender or other intimate blender for about one minute or longer. In addition, all parts and percentages are by weight, unless expressly indicated to be otherwise.

EXAMPLES 1–4

Long Term Stability of Several Packaged, Cooked, Starchy Foodstuffs

These examples demonstrate the long term stability of packaged, fully cooked, starchy foodstuffs prepared in accordance with one preferred embodiment of the process of this invention. The package produced were suitable for use as the ready-to-eat meals provided by this invention and also as the packaged meals provided by this invention.

The starchy foodstuffs in Examples 1–4 were prepared by boiling in excess water until fully cooked. Rice was boiled for approximately 12 to 14 minutes to achieve a final moisture content of about 72% to 75% by weight. Elbow macaroni having a size of about 1" in length and ⅜" in diameter was boiled 6 to 7 minutes to achieve a final moisture content of about 68% to 72%. Egg noodles of 1½" length and 1/16" thickness were boiled for 7 to 9 minutes to achieve a final moisture content of about 66% to about 70% by weight. The excess water was drained after these cooking times.

Edible acids diluted in water to an acid: water ratio of about 1:10, i.e. to a concentration of about 9%, were then added to the fully cooked, starchy foodstuffs. For rice, about 0.9% by weight the lactic acid solution and about 0.27% by weight the propionic acid solution were added, based on the weight of starchy foodstuff. For elbow macaroni, about 1.0% by weight the lactic acid solution and about 0.030% by weight of the propionic acid solution were added, based on the weight of starchy foodstuff. For the egg noodles, about 1.1% by weight of the lactic acid solution and about 0.033% by weight of the propionic acid solution were added, based on the weight of starchy foodstuff.

After the addition of acid, agitation of the components was accomplished within a ribbon-type mixer for 1 to 3 minutes. During mixing, corn oil was added in all examples to minimize sticking. To rice, about 8% by weight corn oil, based on the dry weight of rice, was added. For elbows, about 6% by weight corn oil was added, based on the dry weight of elbows, and for egg noodles, about 7% by weight corn oil was added, based on the dry weight of egg noodles. After the addition of corn oil, mixing continued in the ribbon mixer for about 1 to 3 minutes. The temperature of each starchy foodstuff was maintained about 180° F. (82° C.) in preparation for sealing within polyester pouches.

About 200 g to about 250 g of each of the starchy foodstuffs were filled in 6½" by 8", 2 mil polyethylene terephthalate polyester film pouches. These pouches were heat sealed and passed through a steam saturation tunnel to raise or maintain the internal temperature to about 180° F. (82° C.) or above within each pouch.

TABLE I

Stability Tests

Samples of the packaged foodstuffs produced in Examples 1–4 were evaluated for storage stability (bacterial growth) and the results were reported below.

| Example No. | Starchy Food-Stuff | RT[a]/ 30% RH[b] | 86° F. (30° C.) 30% RH | 86° F. (30° C.) 85% RH[b] |
|---|---|---|---|---|
| | | Storage Time in Months | | |
| 1 | Elbow Macaroni | 9 | — | — |
| 2 | Elbow Macaroni | 9 | 9 | 9 |
| 3 | Rice | 9 | 9 | 9 |
| 4 | Egg Noodles | 9 | 9 | 9 |

[a]RT is room temperature.
[b]RH is relative humidity.

Bacterial growth was monitored over the course of 9 months. The total plate count for samples taken from Examples 2 and 3 above was found to decrease from 102 colonies to 80 colonies per gram after 8 weeks storage at 180° F. (82°C.) indicating microbiological growth was still inhibited at this time. The total plate count was acceptable after 9 months. The starchy foodstuffs were found to have the same acceptable flavor and texture after storage for 9 months as when first packaged. Beyond 9 months, microbiological spoilage was inhibited but taste, flavor and texture were found to deteriorate.

EXAMPLE 5

Package of Acid/Rice Admixture Low End of the pH Range

This example demonstrates the stability of packages produced by this invention where the starchy foodstuff has a pH hear the low end of the range of suitable values. Packages of fully cooked rice were produced by heating water (about 26.5 pounds) with about 200 g edible oil to a boil in a jacketed kettle, adding rice (about 11 pounds par-boiled rice) and returning the water to a boil. After 12 minutes, the heat was turned off, the kettle covered, and the rice was allowed to stand in the hot water for about 3 minutes. The kettle was then filled with more hot water and stirred with a spoon.

The excess water was drained and the cooked rice (about 29.5 pounds) was transferred to a ribbon mixer. A dilute lactic acid solution (55 g acid + 550 g water) was added and mixed in the ribbon mixer, followed by the addition of 600 g corn oil. The oil and acidified rice were mixed until the oil was uniformly dispersed.

About 59 pouches were each filled with about 220 g to 230 g of the rice/acid/oil mixture and sealed. The pouches were then heated in a steam chamber for about 9 minutes or until an internal temperature of at least 180° F. (82° C.) was reached. The pH of the rice in a sample pouch was found to be 3.62 utilizing the following procedure; a 50 gm sample of rice was obtained from the pouch, blended with an equal amount (50 gm) of distilled water in a Waring blender for 1 minute and the pH of the resultant slurry was measured with a pH meter. Conventional pH meters such as a Corning pH meter and Beckman pH meter were used. To test for shelf stability, 4 bags were placed in 86° F. (30° C.)/85%RH for 1 week and no sign of microbiological growth was observed at the end of that time.

EXAMPLE 6

Package of Acid/Rice Admixture High End of the pH Range

This example demonstrates the stability of packages produced by this invention where the starchy foodstuff has a pH near the high end of the range of suitable values. Packages of fully cooked rice were produced by heating 19.25 pounds of water with 200 g corn oil in a Groen kettle to a boil and adding 11.0 pounds rice. After 9.5 minutes of boiling, the heat was turned off and the kettle covered. After an additional 6 minutes with no stirring, the rice was transferred to a Ribbon-Type Mixer. The rice was mixed with dilute acid at a concentration of about 13% (55 g of 85% lactic acid + 300 g water) and about 600 g corn oil. Individual pouches were filled with 230±10 g of the rice/oil/acid mixture. All pouches were then sealed, then heat treated for 9 minutes in a steam chamber. The heat treated pouches were exposed to 86° 30° RH for about 1 week. The pH of the treated rice within a sample pouch was about 4.65, as measured by the procedure of Example 5. No spoilage was observed at the end of 1 week.

EXAMPLE 7

Package of Acid/Rice Admixture Without a Sterilization or Pasteurization Step This example demonstrates that a separate sterilization or pasteurization step is not necessary in the process of this invention if the starchy foodstuff is maintained pasteurized/sterile after cooking. Individual sealed packages produced in accordance with Example 6 were exposed to 86° F.(30° C.)/85%RH for 1 week without heat treatment in a steam chamber. The pH of the treated rice within a sample pouch was about 4.20 after 1 week as measured by the procedure of Example 5. No spoilage resulted in these pouches.

CONTROL A

Packages of Acid/Rice Admixtures Neutralized to a pH Below 5

This control demonstrates the importance of neutralizing the starchy foodstuff to a pH above 5 to obtain acceptable flavor. Packages of fully cooked rice were prepared by bringing 21.0 pounds of water to a rapid boil in a Groen kettle, adding about 11.0 pounds of rice (Parboiled rice) and 176.0 g of mixing oil (Centrafry) and returning the water to a boil. After 9.5 minutes, the heat was turned off and the rice was allowed to stand for 10 minutes with stirring at 3 minutes intervals. The cooked rice was transferred to a Seconmak tumbler and agitated. Dilute lactic acid at about 15.5% concentration (100 g 85% lactic acid + 450 g water) was quickly added, followed by lubricant (600 g Centrafry oil + 24 g lecithin).

Fifteen pouches were each filled with the rice/acid/oil mixture (about 220 g), sealed, and heat pasteurized in a steam chamber. The contents of sampled pouches had a pH value of about 3.86, as measured by the procedure of Example 5, and a moisture level of about 60% by weight. Three pouches were placed in 86° F.(30°)/85%RH for about 1 week. The total plate count (bacteria) after the 1 week was less than 10.

Two 50 g samples of rice were taken from a sample package and neutralized by adding water (100 g) and mixing 15 g and 30 g, respectively, of a blend of seasoning and the neutralizing agent described below. The neutralizing agent was mixed with seasoning in a 30:1 weight ratio of seasoning to neutralizing agent. Mixing proceeded for about 1 minute. The mixture was then heated in a sauce pan until the sodium bicarbonate was released. The final pH was about 4.90 and 4.48 for the meals having 30 g seasoning/neutralizing agent and 15 g seasoning/neutralizing agent, respectively. The final pH was determined by forming a slurry of rice sample with distilled water as in Ex. 5, with a Waring blender, and measuring the pH of the slurry. The taste of each 50 g sample was distinctly sour.

Neutralizing Agent

The neutralizing agent was a food grade encapsulated sodium bicarbonate provided by SCM® Durkee Industrial Foods under the trademark DURKOTE® sodium bicarbonate 135–70 wherein the sodium bicarbonate is encapsulated with vegetable oil so as to not react or release prematurely. The sodium bicarbonate is coated with vegetable oil so as to not react or release prematurely.

This encapsulated sodium bicarbonate is designed to be used in combination with food acids in dry mix baking and other chemically leavened products were it is desired to delay and control the reaction of an acid and the encapsulated sodium bicarbonate. The encapsulation process provides the formulator with the ability to engineer a consistent quality product. According to product specifications of Durkee Industrial Foods, this particular encapsulated sodium bicarbonate comprises about 70% by weight anhydrous sodium bicarbonate (substrate) and about 30% by weight partially hydrogenated palm oil (coating). This Durkote® encapsulated sodium bicarbonate 135–70 is packed in 100 pound (45.3 kilogram) polyethylene lined fiber drums and is stable at temperatures below 80° F. in odor free environments.

EXAMPLE 8

Packages of Acid/Rice Admixture Neutralized to a pH Above 5

This example illustrates that acceptable flavor is obtained where the starchy foodstuff is neutralized to a pH above 5. Packages of fully cooked rice were prepared by bringing about 21.0 pounds of water to a rapid boil in a Groen kettle, adding 11.0 pounds of rice (parboiled) with about 176 g of oil (Centrafry) and returning the water to a boil. The heat was shut off after 9.5 minutes and the rice was allowed to stand for about an additional 10 minutes with stirring at 3 minute intervals. After standing, the cooked rice was transferred to a ribbon-type mixer. Dilute acid at about 15.5% concentration (67 g 85% lactic acid and 300 g water) was sprayed on to the rice to enhance dispersion. Lubricating oil (about 600 g Centrafry oil and 24 g lecithin) was immediately poured over the rice.

Individual pouches were each filled with about 220±10 g of the rice/oil/acid mixture, sealed while the mixture was still hot (about 180°), and heat pasteurized in a steam chamber at a temperature above 180° F. for 10 minutes or more. The pH of the cooked rice was sampled in 4 bags and found to be 4.38, 4.47, 4.36 and 4.38, respectively, following the procedures described in Example 5 for pH measurement. The moisture level for the rice in the pouches was approximately 59.7% by weight. Samples of rice (about 220 g) were obtained from each pouch and each was mixed with a blend of seasoning and the neutralizing agent described above in the following amounts.

(1) 10 g of a blend having a 30:1 to seasoning to neutralizing agent weight ratio;

(2) 20 g of a blend having a 30:1 to seasoning to neutralizing agent weight ratio;

(3) 20 g of a blend having a 20:1 to seasoning to neutralizing agent weight ratio; and (4) 10 g of a blend having a 10:1 seasoning to neutralizing agent weight ratio.

Upon neutralization, brought about by heating in a sauce pan the mixture of rice with the seasoning-neutralizing agent blend, the above samples (1–4) were found to have the following pH values: 5.66, 5.19, 6.23 and 6.49, respectively, utilizing the pH measurement procedures described in Example 5. All samples exhibited good taste with no objectionable sourness. These data suggest that 13 g of seasoning to 1 g of sodium bicarbonate is the preferred level for the package, fully cooked, starchy foodstuffs of Example 8.

CONCLUSION

While the invention has been disclosed by reference to the details of preferred embodiments, this disclosure is intended to be in an illustrative rather than in a limiting sense, as it is contemplated that modifications will readily occur to those skilled in the art, within the spirit of the invention and the scope of the appended claims. This invention includes many embodiments which have not been described in the detail provided by the above examples. The absence of such detail for all embodiments does not exclude them from the embodiments claimed herein. These examples described above could be repeated with other starchy foodstuffs, edible acids, lubricants and neutralizing agents with similar results.

What is claimed is:

1. A process for preparing a preserved, packaged pasta or rice foodstuff characterized by inhibited microbiological spoilage comprising the sequential steps of:

(a) heating said foodstuff in its raw uncooked state at a temperature of at least 180° F. (82° C.) to cook said foodstuff fully and render it edible, then (b) applying to said fully cooked foodstuff of step (a) a quantity of an aqueous solution of an edible acid while maintaining said foodstuff at a temperature of at least about 180° F. (82° C.), said quantity of said aqueous acid solution being sufficient to produce a pH of said cooked acidified foodstuff in the range from 3.5 to 4.6, inclusive, as determined by placing a 50 g sample of said acidified cooked foodstuff and 50 g of distilled water in a Waring or other intimate blender and operating said blender to form a puree, then observing the pH of said puree, then (c) as an optional step mixing said foodstuff with edible oil, and then (d) sealing said acidified foodstuff of step (b) or optionally the acidified foodstuff of step (c) in an oxygen-barrier package, whereby a shelf-stable cooked foodstuff is obtained as a packaged product that, when the package is opened, is cooked and edible.

2. The process of claim 1 wherein the amount of acid added to said cooked foodstuff is such as to adjust the pH of said hot acidified foodstuff to a value in the range of 4.0 to 4.6, inclusive.

3. The process of claim 1 including, as an additional step, that of heating the packaged cooked foodstuff for a time and at a temperature to sterilize the contents of said package.

4. The process of claim 1 comprising the added step of incorporating in said package an inert atmosphere comprising nitrogen, prior to sealing it.

5. The process of claim 2 wherein the pH is adjusted to a value in the range of about 4.2 to about 4.5, inclusive.

6. The process of claim 5 wherein the pH is about 4.3.

7. The process of claim 5 wherein said foodstuff comprises pasta prepared from a flour selected from the group consisting of semolina, durum wheat, corn, buckwheat, farina, rice, whole wheat, and mixtures thereof.

8. A process of preparing an edible starchy foodstuff of pasta or rice that is characterized by inhibited microbiological spoilage, comprising the sequential steps of:

heating said foodstuff at a temperature of at least about 180° F. (82° C.) to fully cook said foodstuff and render it edible, then applying to said fully cooked foodstuff an aqueous solution of an edible acid while maintaining said foodstuff at a temperature of at least about 180° F. (82°C.), whereby the pH of said hot acidified foodstuff is adjusted to be in the range from about 3.5 to about 4.6, as determined by placing a 50 g sample of said acidified cooked foodstuff together with 50 g of distilled water in a Waring or other intimate blender and operating said blender to form a puree, then measuring the pH of said puree, then optionally coating said foodstuff with edible oil, whereby a shelf-stable cooked foodstuff is obtained.

9. The process of claim 8 wherein the amount of said acid employed is sufficient to adjust the pH of said acidified foodstuff to be in the range from about 4.2 to about 4.5.

10. The process of claim 8 wherein said process includes the additional step of pasteurizing or sterilizing said acidified foodstuff by heating it at a temperature and for a sufficient time to sterilize it.

11. A fully cooked foodstuff that is adapted to be packaged in an oxygen-barrier container for storage, wherein said foodstuff is characterized by inhibited microbiological spoilage, consisting essentially of a fully cooked, edible, starchy foodstuff selected from the group consisting of rice and alimentary pastes from wheat or rice, said fully cooked foodstuff having applied thereto, after being fully cooked, and while being maintained at a temperature of at least 180° F. (82.2° C.), a sufficient amount of an aqueous solution of an edible acid to lower the pH of said foodstuff to fall within the range from about 3.5 to about 4.6 as determined by placing a 50 g sample of said acidified foodstuff, together with 50 g of distilled water, in a Waring or other intimate blender and operating said blender to form a puree, then measuring the pH of the puree, wherein said fully cooked, acidified foodstuff optionally is mixed with an edible oil.

12. The foodstuff of claim 11 wherein said acid is applied in sufficient amount that the pH of said blended foodstuff is in the range of about 4.2 to to about 4.5.

13. The foodstuff of claim 12 that is sealed within a pasturized or sterilized oxygen barrier package.

14. The packaged foodstuff of claim 13 wherein an inert atmosphere of nitrogen is sealed in said package.

15. The starchy foodstuff of claim 14 consisting essentially of pasta.

16. A packaged, shelf-stable, fully cooked pasta product consisting essentially of a pouch made of a synthetic resin film that substantially isolates the contents of the pouch from atmospheric oxygen, the contents of said pouch being a preserved food composition consisting essentially of a fully cooked pasta, an edible acid mixed with said pasta and disposed in said pouch in a quantity sufficient to provide a pH for said pasta having a value in a range from about 4.0 to 4.6, as determined by placing a 50 g sample of acidified pasta together with 50 g of distilled water in a Waring or other intimate blender and operating said blender to form a puree, then measuring the pH of said puree, and optionally an edible lubricant mixed with said fully cooked pasta and disposed in said pouch in a quantity less than about 15% by weight of the total weight of said preserved food composition.

17. The packaged pasta of claim 16 wherein said edible acid is selected from the group consisting of propionic acid, lactic acid, and combinations thereof, and wherein said pH value is in the range from about 4.2 to about 4.5.

18. The packaged pasta of claim 16 wherein said synthetic resin film comprises a polyester film that is also a barrier to oxygen.

19. The packaged pasta of claim 16 wherein said edible acid is in the form of an aqueous solution at a concentration of the acid of not above about 12% by weight, and wherein the atmosphere in said pouch is predominantly nitrogen gas.

* * * * *